United States Patent [19]

Mochizuki et al.

[11] Patent Number: 5,290,864
[45] Date of Patent: Mar. 1, 1994

[54] THERMOPLASTIC POLYBUTYLENE TEREPHTHALATE RESIN COMPOSITIONS AND MOLDED ARTICLES FORMED THEREOF

[75] Inventors: Mitsuhiro Mochizuki; Mitsuo Wada, both of Fuji, Japan

[73] Assignee: Polyplastics Co., Ltd., Osaka, Japan

[21] Appl. No.: 896,903

[22] Filed: Jun. 11, 1992

Related U.S. Application Data

[63] Continuation of Ser. No. 734,117, Jul. 25, 1991, abandoned, which is a continuation of Ser. No. 314,109, Feb. 23, 1989, abandoned.

[30] Foreign Application Priority Data

Mar. 16, 1988 [JP] Japan .................. 63-62945

[51] Int. Cl.$^5$ ............................. C08L 67/02
[52] U.S. Cl. ....................... 525/166; 525/64
[58] Field of Search .................. 525/64, 166

[56] References Cited

U.S. PATENT DOCUMENTS 4,172,859  10/1979  Epstein ................. 428/402

FOREIGN PATENT DOCUMENTS

| | | |
|---|---|---|
| 0060601 | 9/1982 | European Pat. Off. . |
| 0180648 | 5/1986 | European Pat. Off. . |
| 0287245 | 10/1988 | European Pat. Off. . |
| 0295706 | 12/1988 | European Pat. Off. . |
| 295706 | 12/1988 | European Pat. Off. ............ 525/64 |
| 2207162 | 6/1974 | France . |
| 59-004618 | 1/1984 | Japan . |

OTHER PUBLICATIONS

Chemical Abstracts, vol. 87, No. 2, Jul. 11, 1977, p. 45.
WPIL, File Supplier, Derwent Publications Ltd., London, GB; AN-82-75517E & JP-A-57 123 251. (abstract).

*Primary Examiner*—Patricia A. Short
*Attorney, Agent, or Firm*—Nixon & Vanderhye

[57] ABSTRACT

A thermoplastic polyester composition is improved in mechanical properties and comprises a polyester, a vinyl polymer having —COOH, alkyl ester of —COOH, phenyl or cyano and an olefin copolymer comprising an alpha-olefin and an alpha, beta-unsaturated acid glycidyl ester or ($C^2$) a graft copolymer comprising said olefin copolymer ($C^1$) and one or more (co)polymers mainly comprising repeating units represented by the following general formula (2), wherein said copolymer ($C^1$) and said (co)polymers are chemically bonded to each other to form a branched or crosslinked structure:

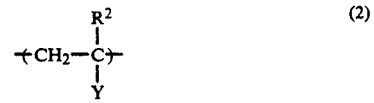

wherein $R^2$ stands for a hydrogen atom or a lower alkyl group and Y stands for one or more groups selected from —COOH, an alkyl ester of —COOH having 1 to 8 carbon atoms in the alkyl, phenyl and cyano.

2 Claims, 1 Drawing Sheet

THERMOPLASTIC POLYBUTYLENE TEREPHTHALATE RESIN COMPOSITIONS AND MOLDED ARTICLES FORMED THEREOF

This is a continuation of application Ser. No. 07/734,117, filed Jul. 25, 1991, now abandoned, which is a continuation of application Ser. No. 07/314,109, filed Feb. 23, 1989, now abandoned.

FIELD OF INVENTION

The present invention relates to a thermoplastic polyester resin composition to a thermoplastic polyester resin composition having improved flexural endurance and impact resistance and otherwise excellent exhibits mechanical properties, such as stiffness, heat resistance and moldability.

Thermoplastic polyester resins are known to possess excellent mechanical and electrical properties in addition to excellent chemical resistance and processability properties. For these reasons, thermoplastic polyester resins are properties widely used in the production of automobile components, electric or electronic equipment, business and other machines, building materials, and the like. Furthermore, polyester resins have recently been identified as a candidate material for special end-use applications requiring property enhancements and/or modifications. For example, some end-use applications demand a polyester resin composition having improved flexural endurance and impact resistance without lowering the other attractive mechanical properties, heat resistance and moldability of the polyester resin.

To satisfy these enhanced properties requirements, a flexible resin or rubbery substance is conventionally added to a thermoplastic polyester resin to thereby render the polyester resin more flexible. Particularly, many studies have been conducted with a purpose of improving the impact resistance of polyester resins.

In this regard, Japanese Patent Publication Nos. 26223/1970, 26224/1970 and 26225/1970 disclose methods of adding an ethylene-vinyl acetate copolymer, a butadiene-butyl acrylate copolymer or an ionic ethylene-sodium methacrylate copolymer to polyester resins. However, these techniques have disadvantages in that the disclosed copolymers must be added in relatively large amounts in order to obtained the desired effects. In addition, the copolymers have poor in affinity for polyester resins and thus are typically insufficient in thermal deformation temperature. As a result the addition such copolymers significantly lowers the resins physical properties, particularly stiffness or shear strength and/or adversely affects the resins moldability or heat resistance, even though for certain end-use applications Japanese Patent Laid-Open Nos. 32045/1977 and 144452/1976 disclose adding an olefin copolymer comprising an α-olefin, an α,β-unsaturated acid glycidyl ester and, if necessary, another monomer such as vinyl acetate or acrylate. Although this prior technique effectively improves the resin's impact resistance, to some degree, resulting the composition still exhibits insufficient impact resistance for certain end-use applications and, moreover, unavoidably lowers the resin's stiffness.

Meanwhile, few, if any, studies have been made regarding the flexural endurance of polyester resin (which is one principal object of the present invention). It has however, been generally thought that the flexural endurance, as well as the impact resistant, would be improved by the addition of a flexible resin or the like.

The present inventions have found that, although polyester resin compositions do become more flexible, when a relatively more flexible resin has been added, the composition unexpectedly exhibits little improvement in flexural endurance and thus results in a problematic lower of the resins mechanical strengths, such as stiffness or heat resistance properties (thermal deformation temperature). The present invention is therefore directed to thermoplastic polyester resin compositions having improved flexural endurance and impact resistance properties in addition to exhibiting the excellent physical characteristics inherent with thermoplastic polyester resins.

More specifically, the present invention relates to a thermoplastic polyester resin composition comprising
(A) 100 parts by weight of a thermoplastic polyester resin,
(B) 1 to 100 parts by weight of a polymer or copolymer mainly comprising repeating units represented by the following general formula (1):

wherein $R^1$ stands for a hydrogen atom or a lower alkyl group and X stands for one or more groups selected from among —COOH and lower alkyl esters thereof,

and
(C) 0.5 to 80 parts by weight of ($C^1$) an olefin copolymer comprising an α-olefin and an α,β-unsaturated acid glycidyl ester or ($C^2$) a graft copolymer comprising said olefin copolymer ($C^1$) and one or more (co)polymers mainly comprising repeating units represented by the following general formula (2), wherein said copolymer ($C^1$) and said (co)polymers are chemically bonded to each other to form a branched or crosslinked structure:

wherein $R^2$ stands for a hydrogen atom or a lower alkyl group and Y stands for one or more groups selected from among —COOH, —COOCH$_3$, —COOC$_2$H$_5$, —COOC$_4$H$_5$, —COOCH$_2$CH(C$_2$H$_5$)C$_4$H$_9$,

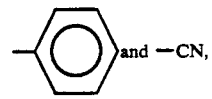

DESCRIPTION OF ACCOMPANYING DRAWINGS

FIG. 1 is a schematic illustration of a test piece for testing the flexural endurance of resin compositions, wherein (a) is a plan view thereof, (b) is an elevational view thereof, and (c) is an enlarged view of the bent area thereof.

DETAILED DESCRIPTION OF THE INVENTION

Figure 1A:
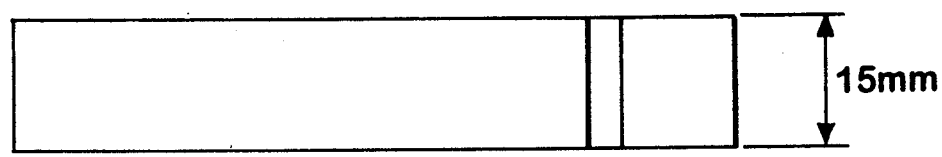

The thermoplastic polyester resin (A) to be used in the compositions of the present invention may be any one prepared by the polycondensation of (i) a dicarboxylic acid with a dihydroxy compound, (ii) a hydroxy carboxylic acid or (iii) all three such compounds, and includes homopolyesters and copolyesters.

Examples of the dicarboxylic acid that may be used in the preparation of the thermoplastic polyester resin (A) include conventional dicarboxylic acids such as terephthalic, isophthalic, naphthalenedicarboxylic, diphenyldicarboxylic, diphenyl ether dicarboxylic, diphenylethanedicarboxylic, cyclohexanedicarboxylic, adipic and sebacic acids, and alkyl-, alkoxy- or halogen-substituted derivatives thereof. Further, these dicarboxylic acids may be used as their ester-forming derivatives, for example, esters thereof with lower alcohols (such as dimethyl esters). According to the present invention, one or more compounds selected from among those described above may be used.

Examples of the dihydroxy compound include dihydroxy compounds such as ethylene glycol, propylene glycol, butanediol, neopentyl glycol, butenediol, hydroquinone, resorcinol, dihydroxyphenol, naphthalenediol, dihydroxydiphenyl ether, cyclohexanediol and 2,2-bis(4-hydroxyphenyl)propane; polyoxyalkylene glycols and alkyl-, alkoxy- or halogen-substituted derivatives thereof. According to the present invention, one or more compounds selected from among those described above may be used.

Examples of the hydroxy carboxylic acid include hydroxy carboxylic acids such as hydroxybenzoic, hydroxynaphthoic and hydroxydiphenylene-carboxylic acids and alkyl-, alkoxy- or halogen-substituted derivatives thereof. Further, ester-forming derivatives of these compounds may be used as the hydroxy carboxylic acid. According to the present invention, one or more compounds selected from among those described above may be used.

Any of the thermoplastic polyesters prepared by the polycondensation of compounds as described above may be used in the present invention either alone or as a mixture of two or more of the same. It is preferred that a polyester mainly comprising polyalkylene terephthalate, be used, and more preferred is one mainly comprising polybutylene terephthalate. When such a preferred polyester is used, the effect of the present invention is particularly significant.

Alternatively, it is also possible to use a thermoplastic polyester modified by conventional crosslinking, graft polymerization or the like in the present invention.

The polymer to be used as the component (B) in the present invention is a polymer or copolymer mainly comprising repeating units represented by the following general formula (1):

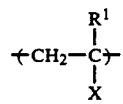

(1)

wherein $R^1$ is hydrogen or a lower alkyl group, preferably having 1 to 6 carbon atoms, and X is one or more groups selected from —COOH and lower alkyl esters, the alkyl preferably having 1 to 6 carbon atoms, of —COOH, phenyl and cyano, and can be prepared by the polymerization of one monomer selected from among vinyl cyanide compounds such as acrylonitrile or methacrylonitrile; acrylates such as methyl acrylate, ethyl acrylate or butyl acrylate; methacrylates such as methyl methacrylate or butyl methacrylate; acrylic and methacrylic acids and aromatic vinyl compounds such as styrene or α-methylstyrene, or the copolymerization of two or more of these compounds.

Particular examples of the component (B) include polymethyl methacrylate, polyethyl acrylate, polybutyl acrylate, polyacrylonitrile, polystyrene, acrylonitrile-styrene copolymers, methyl methacrylate-styrene copolymers, methyl methacrylate-acrylic acid copolymers and methyl methacrylate-butyl acrylate copolymers.

These (co)polymers may be modified with a small amount of an ethylenically unsaturated compound, rubbery component or acid anhydride by copolymerization or graft polymerization.

According to the present invention, one or more polymers selected from among those described above may be added to a polyester resin. Particularly, it is preferred to add an acrylonitrile-styrene copolymer, polymethyl methacrylate or polystyrene.

Further, the polymer (B) may be added in an amount of 1 to 100 parts by weight, preferably 3 to 80 parts by weight, per 100 parts by weight of the polyester resin (A).

In the composition of the present invention, the polymer (B) not only serves to maintain the stiffness and strength, but also has a significant effect on improving the resin's flexural endurance. If the amount of the polymer (B) is too small, these advantageous effects will not be apparent. On the other hand, if the amount added is too large, the excellent mechanical, physical and chemical properties inherent in thermoplastic polyester resins will be lost, and the processability and appearance will also be adversely affected.

The polymer to be used as the component (C) in the present invention is ($C^1$) an olefin copolymer comprising an α-olefin and an α,β-unsaturated acid glycidyl ester or ($C^2$) a graft copolymer comprising said olefin copolymer ($C^1$) and one or more (co)polymers mainly comprising repeating units represented by the following general formula (2), wherein said copolymer ($C^1$) and said copolymers are chemically bonded to each other to form a branched or crosslinked structure:

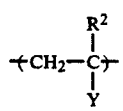

(2)

wherein $R^2$ is hydrogen or a lower alkyl, preferably having 1 to 6 carbon atoms, and Y is —COOH, a lower alkyl ester of —COOH, preferably having 1 to 8 carbon atoms in the alkyl, such as —COOH, —COOCH₃, —COOC₂H₅, —COOC₄H₉, —COOCH₂CH (C₂H₅)C₄H₉, phenyl or cyano.

First, the olefin copolymer (C¹) which is one of the polymers usable as the component (C) will be described.

One of the monomers constituting the olefin copolymer (C¹) is an a-olefin and examples thereof include ethylene, propylene and butene-1, among which ethylene is preferred. Meanwhile, the α,β-unsaturated acid glycidyl ester which is the other monomer constituting the olefin copolymer (C¹) is a compound represented by the following general formula (3):

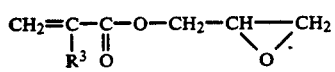    (3)

wherein R³ stands for a hydrogen atom or a lower alkyl group, and examples of the compound include glycidyl acrylate, glycidyl methacrylate and glycidyl ethacrylate, among which glycidyl methacrylate is preferred. The olefin copolymer (C¹) can be prepared by copolymerizing an olefin such as ethylene with an α,β-unsaturated acid glycidyl ester by a conventional radical polymerization method.

It is preferred that the olefin copolymer (C¹) comprise 70 to 99% by weight of an α-olefin and 30 to 1% by weight of an unsaturated acid glycidyl ester.

The olefin copolymer (C¹) may further contain other vinyl monomer, for example, vinyl acetate, styrene or methyl acrylate, in an amount not exceeding 30% by weight.

The graft copolymer (C²) is one comprising the copolymer (C¹) and one or more (co)polymers comprising repeating units represented by the general formula (2), wherein said olefin copolymer and the (co)polymers are chemically bonded to each other to form a branched or crosslinked structure. Examples of the (co)polymer to be grafted include polymethyl methacrylate, polyethyl acrylate, polybutyl acrylate, poly-2-ethylhexyl acrylate, polystyrene, polyacrylonitrile, acrylonitrile-styrene copolymers, butyl adrylate-methyl methacrylate copolymers and butyl acrylate-styrene copolymers. These polymers and copolymers can be prepared by the radical polymerization of the corresponding vinyl monomer(s).

Although the process for the preparation of the graft copolymer comprising the olefin copolymer (C¹) and a specified (co)polymer as described above is not particularly limited, the graft copolymer can be easily prepared by radical reaction. For example, a specified (co)polymer as described above is reacted with a peroxide to generate free radicals therein and the resulting (co)polymer is kneaded with an olefin copolymer (C²) to obtain a graft copolymer (C²).

The olefin copolymers (C¹) and graft copolymers (C²) thus prepared are all usable as the component (C) and they may be used either alone or as a mixture of two or more of them. It is particularly preferred to use the graft copolymer (C²) in the present invention and the graft copolymer (C²) exhibits a unique effect due to its branched or crosslinked structure. Particularly, it is still preferred to use a graft copolymer comprising the olefin copolymer (C¹) and a specified (co)polymer as described above in a weight ratio between 95:5 and 40:60.

In the present invention, the component (C) may be added in an amount of 0.5 to 80 parts by weight, preferably 1 to 50 parts by weight, per 100 parts by weight of the polyester resin (A).

If the amount of the component (C) is too small, the objective improvement in the flexural endurance, and impact resistance will not be attained. On the other hand if the amount thereof is too large, the thermal deformation temperature will be lowered and the mechanical properties, such as stiffness will be adversely affected.

Thus, the compositions of the present invention are significantly improved in flexural endurance and impact resistance, and exhibits excellent mechanical properties, such as stiffness, shear strength and moldability.

Particularly, the compositions of the present invention exhibit excellent endurance against sharp repeated bending so that they are particularly suitable for the production for hinged molded articles.

The compositions of the present invention may further contain a fibrous, powdery, granular or lamellar filler to thereby improve their mechanical strengths, heat stability, dimensional stability (resistance to deformation or warping), electrical properties or the like. Although the addition of such a filler lowers the maximum bending angle of the compositions, the filled composition according to the present invention are superior to those prepared according to the prior art in regard to endurance and toughness.

Examples of fibrous fillers include inorganic fibrous materials such as fibers formed of glass, asbestos, carbon, silica, silica-alumina, zirconia, boron nitride, silicon nitride, boron, potassium titanate, and fibers formed of metals such as stainless steel, aluminum, titanium, copper or brass. Glass fibers and carbon fibers are particularly preferred. Furthermore, it is possible to use a high-melting organic fibrous material such as polyamide, a fluororesin or an acrylic resin, as well as an inorganic fibrous fiber as described above.

Examples of powdery or granular fillers include carbon black, silica, quartz powder, glass beads, glass powder, silicates such as calcium silicate, aluminum silicate, kaolin, talc, clay, diatomaceous earth and wollastonite; metal oxides such as iron oxides, titanium oxide, zinc oxide and alumina; metal carbonates such as calcium carbonate and magnesium carbonate; metal sulfates such as calcium sulfate and barium sulfate; silicon carbide, silicon nitride, boron nitride and various metal powders.

Lamellar fillers include mica, glass flake and various metal foils.

These inorganic fillers may be used alone or as a mixture of two or more of the same. The combination of a fibrous filler, particularly glass fibers or carbon fibers, with a granular and/or lamellar filler is preferred for producing an article which exhibits excellent mechanical strengths, dimensional accuracy and electrical properties.

If necessary, a coupling agent or a surface treatment may be used together with a filler as described above. Examples thereof include functional compounds such as epoxy, isocyanate, silane and titanate compounds. These compounds may be preliminarily applied to the filler or may be added together with a filler in the preparation of the composition.

The amount of the inorganic filler used per 100 parts by weight of the polyester resin (A) is 0 to 200 parts by weight and may be suitably selected depending upon the object or the kind of the additives. For example, when the object is to enhance the mechanical strengths (such as stiffness), the amount is preferably 5 to 200 parts by weight, still preferably 10 to 150 parts by weight. If the amount of the inorganic filler is too small, the mechanical strengths will be slightly poor, while if it is too large, the moldability of the resulting composition will be poor and the molded article made thereof will be problematic in mechanical strengths.

The composition of the present invention may further contain other thermoplastic resins as an auxiliary component in addiction to the above components depending upon the properties that are desired. Any thermoplastic resin may be used provided it is stable at high temperatures. Examples thereof include polyethylene, polyamide, polycarbonate, polyphenylene sulfide, polyphenylene oxide, polyacetal, polysulfone, polyether sulfone, polyetherimide, polyether ketone and fluororesins. These resins may be also used as a mixture of two or more of the same.

Furthermore, the composition of the present invention may suitably contain, depending upon the required performance, additives which are generally used in thermoplastic or thermosetting resin compositions. Examples of such additives include stabilizers such as antioxidants or ultraviolet absorbers; antistatic agents, flame retardants, coloring agents such as dyes and pigments, lubricants, crystallization accelerators and nucleating agents.

The polyester resin compositions of the present invention can be made with conventional equipment employed to prepare conventional synthetic resin compositions using convention processes. That is, the necessary components may be mixed, kneaded and extruded with a single- or twin-screw extruder to obtain a molding pellet. In this process, a master batch prepared by preliminarily mixing a part of the components may be mixed with a residual part thereof, followed by the molding. Alternatively, a part or entirety of the resin components may be pulverized prior to mixing and extrusion.

As described above, the polyester resin compositions of the present invention exhibit significantly improved flexural endurance and impact resistance properties with substantially no lowering in the other physical properties associated with polyester resins. As a result, the compositions of this invention may be used as a material suitable for various components for automobiles, electric or electronic equipment, business machines, building materials and the like. The compositions of the present invention are particularly suited for the production of hinged molded articles such as connectors for automobiles or electric equipment, owing to its excellent flexing endurance.

EXAMPLES

The present invention will be further described in more detail by reference to the following nonlimiting Examples.

EXAMPLES 1 to 5 and COMPARATIVE EXAMPLES 1 to 5

An acrylonitrile-styrene copolymer (component (B)) and an ethylene-glycidyl methacrylate (85:15) copolymer (component (C); referred to as "E/GMA" in Table 1) were added to polybutylene terephthalate (PBT) each in a ratio given in Table 1. The obtained mixture was kneaded with a twin-screw extruder to obtain a pellet. This pellet was injection-molded into a flexing test piece having a shape shown in FIG. 1 and standard test pieces for the measurement of various physical properties to determine the flexing endurance and other characteristics. The results are shown in Table 1.

For comparison, a composition containing neither the component (B) nor the component (C) (PBT resin alone) and compositions containing the component (B) or (C) alone were prepared and examined similar to the composition described above. The results are also shown in Table 1.

The examination items and test methods are as follows:

tensile characteristics: determined according to ASTM D-638

Figure 1B:
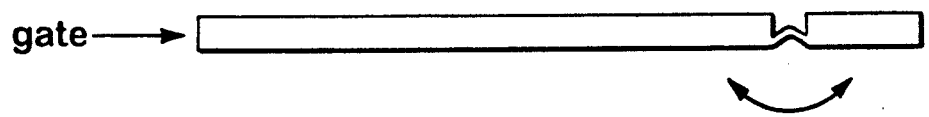
Figure 1C:
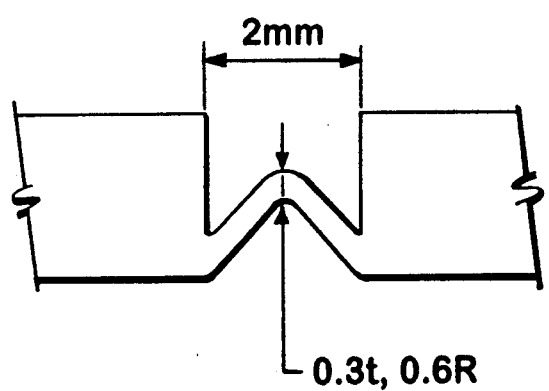

Izod impact strength (notched): determined according to ASTM D-256 flexural modulus: determined according to ASTM D-790 flexing endurance: a test piece having a shape shown in FIG. 1 was bent at an angle of 180° (in a direction of the arrow shown in FIG. 1) in an atmosphere of 23° C. and 50% RH to determine the endurance.

number of samples: n=10

Evaluation A: After a test piece had been once bent at an angle of 180°, the appearance of the resulting piece was observed with eyes to evaluate it according to the following criteria, while the average thereof is shown in Tables:

5: abnormal phenomenum was hardly observed.

4: fine crack was generated in the bent area to result in blushing.

3: slightly grown crack was observed, but the elasticity was retained

2: the bent area was broken, and connected only by the surface thereof.

1: fractured

Evaluation B: A test piece was bent at an angle of 180° ten times to determine the retention of tensile strength with respect to the bent area.

EXAMPLE 4 to 10 and COMPARATIVE EXAMPLES 6 to 12

An acrylonitrile-styrene copolymer (component (B)) and an ethylene-glycidyl methacrylate copolymer. (component (C)) selected from those which will be described were added to a polybutylene terephthalate resin (PBT) or a brominated copolyester which will be described each in a ratio given in Table 2. The obtained compositions were examined and evaluated in a similar manner to the one described in Examples 1 to 3. The results are shown in Table 2.

For comparison, a composition containing neither the component (B) nor the component (C) and compositions each containing the composition (B) or (C) alone were prepared and evaluated similar to the compositions described above. The results are shown in Table 2. The E/GMA graft copolymer used are as follows:

graft copolymer of E/GMA (70) with an acrylonitrile-styrene copolymer (30)

( referred to as "E/GMA-g -AN/S" in Table 2 )

graft copolymer of E/GMA (70) with a methyl methacrylate-butyl acrylate copolymer (30)

( referred to as "E/GMA-g -MMA/BA in Table 2 )

The brominated copolyester is one prepared by copolymerizing dimethyl terephthalate, 1,4-butanediol and an adduct of tetrabromobisphenol A with ethylene oxide (2 mol) and having an intrinsic viscosity of 1.0 and a bromine content of 6.5% by weight.

EXAMPLES 11 to 14 and COMPARATIVE EXAMPLES 13 to 17

Polymethyl methacrylate or polystyrene (component B)) and a graft copolymer (component (C)) selected from among the three graft copolymers of an ethylene-glycidyl methacrylate copolymer (E/GMA) which will be described were added to a polybutylene terephthalate resin (PBT) each in a ratio given in Table 3. The obtained compositions were evaluated in a similar manner to the one described in Examples 1 to 3. The results are shown in Table 3.

For comparison, a composition containing neither the component (B) nor the component (C) and compositions containing the component (B) or the component (C) alone were prepared and evaluated similar to the compositions described above. The results are also shown in Table 3.

The graft copolymers of E/GMA used are as follows:

graft copolymer of E/GMA (70) with an acrylonitrile-styrene copolymer (30)
(referred to as "E/GMA-g-AN/S in Table 3)

graft copolymer of E/GMA (70) with polystyrene (30)
(referred to as "E/GMA-g-PS in Table 3)

graft copolymer of E/GMA (70) with polymethyl methacrylate (30)
(referred to as "E/GMA-g-PMMA in Table 3)

EXAMPLES 15 and 16 and COMPARATIVE EXAMPLES 18 to 21

An acrylonitrile-styrene copolymer (component (B)), E/GMA-g-AN/S (component (C)) and a glass fiber (diameter: 13 μm, length: 6 mm, inorganic fiber) were added to polybutylene terephthalate (PBT) or polyethylene terephthalate (PET) each in a ratio given in Table 4. The obtained compositions were examined and evaluated.

For comparison, a composition comprising the component (A) and a glass fiber and a composition containing the component (A), a glass fiber and the component (C) were prepared and evaluated similar to the compositions described above.

The flexing endurance (toughness) was evaluated by the angle at which a test piece having a shape shown in FIG. 1 was broken by bending. The results are shown in Table 4.

TABLE 1

|     |                                      |                                    | Ex. 1 | Ex. 2 | Ex. 3 | Comp. Ex. 1 | Comp. Ex. 2 |
|-----|--------------------------------------|-----------------------------------|-------|-------|-------|-------------|-------------|
| (A) | PBT (pts. wt.)                       |                                   | 75    | 65    | 60    | 100         | 85          |
| (B) | acrylonitrile-styrene copolymer (pts. wt.) |                              | 15    | 25    | 25    | —           | 15          |
| (C) | E/GMA (pts. wt.)                     |                                   | 10    | 10    | 15    | —           | —           |
| Physical properties | flexing endurance 23° C., 50% RH | evaluation A (observation with eyes) | 4.1   | 4.5   | 4.4   | 2.3         | 4.0         |
|     |                                      | evaluation B (retention of strength) | 84    | 90    | 90    | 20          | 81          |
|     | Izod impact strength, notched (kg · cm/cm) |                              | 8.2   | 7.7   | 8.9   | 3.5         | 1.9         |
|     | flexural modulus (kg/cm²)            |                                   | 23200 | 24400 | 23100 | 26200       | 27600       |
|     | tensile strength (kg/cm²)            |                                   | 545   | 572   | 532   | 582         | 610         |
|     | tensile elongation (%)               |                                   | 78    | 56    | 77    | 200<        | 32          |

|     |                                      |                                    | Comp. Ex. 3 | Comp. Ex. 4 | Comp. Ex. 5 |
|-----|--------------------------------------|-----------------------------------|-------------|-------------|-------------|
| (A) | PBT (pts. wt.)                       |                                   | 75          | 90          | 85          |
| (B) | acrylonitrile-styrene copolymer (pts. wt.) |                              | 25          | —           | —           |
| (C) | E/GMA (pts. wt.)                     |                                   | —           | 10          | 15          |
| Physical properties | flexing endurance 23° C., 50% RH | evaluation A (observation with eyes) | 4.3         | 2.9         | 3.1         |
|     |                                      | evaluation B (retention of strength) | 88          | 49          | 53          |
|     | Izod impact strength, notched (kg · cm/cm) |                              | 1.5         | 10.5        | 13.4        |
|     | flexural modulus (kg/cm²)            |                                   | 28500       | 19000       | 17000       |
|     | tensile strength (kg/cm²)            |                                   | 620         | 460         | 435         |
|     | tensile elongation (%)               |                                   | 14          | 200<        | 200<        |

TABLE 2

|     |                                      |                                    | Ex. 4 | Ex. 5 | Ex. 6 | Ex. 7 | Ex. 8 | Ex. 9 |
|-----|--------------------------------------|-----------------------------------|-------|-------|-------|-------|-------|-------|
| (A) | PBT (pts. wt.)                       |                                   | 85    | 75    | 65    | 60    | 75    | 60    |
|     | brominated copolyester (pts. wt.)    |                                   | —     | —     | —     | —     | —     | —     |
| (B) | acrylonitrile-styrene copolymer (pts. wt.) |                              | 10    | 15    | 25    | 25    | 15    | 25    |
| (C) | E/GMA-g-AN/S (pts. wt.)              |                                   | 5     | 10    | 10    | 15    | —     | —     |
|     | E/GMA-g-MMA/BA (pts. wt.)            |                                   | —     | —     | —     | —     | 10    | 15    |
| Physical properties | flexing endurance 23° C., 50% RH | evaluation A (observation with eyes) | 4.2   | 4.3   | 4.7   | 4.7   | 4.2   | 4.6   |
|     |                                      | evaluation B (retention of strength) | 81    | 88    | 95    | 96    | 86    | 93    |
|     | Izod impact strength, notched (kg · cm/cm) |                              | 7.8   | 10.1  | 9.5   | 12.0  | 10.2  | 12.4  |
|     | flexural modulus (kg/cm²)            |                                   | 24100 | 23700 | 25200 | 23800 | 23500 | 23700 |
|     | tensile strength (kg/cm²)            |                                   | 566   | 550   | 576   | 540   | 541   | 535   |

TABLE 2-continued

| | | | tensile elongation (%) | 102 | 86 | 62 | 87 | 91 | 94 |
|---|---|---|---|---|---|---|---|---|---|
| | | | | Ex. 10 | (Comp. Ex. 1) | (Comp. Ex. 2) | (Comp. Ex. 3) | Comp. Ex. 6 | Comp. Ex. 7 |
| (A) | PBT (pts. wt.) | | | — | 100 | 85 | 75 | 90 | 85 |
| | brominated copolyester (pts. wt.) | | | 75 | — | — | — | — | — |
| (B) | acrylonitrile-styrene copolymer (pts. wt.) | | | 15 | — | 15 | 25 | — | — |
| (C) | E/GMA-g-AN/S (pts. wt.) | | | 10 | — | — | — | 10 | 15 |
| | E/GMA-g-MMA/BA (pts. wt.) | | | — | — | — | — | — | — |
| Physical properties | flexing endurance | 23° C., 50% RH | evaluation A (observation with eyes) | 4.2 | 2.3 | 4.0 | 4.3 | 3.3 | 3.5 |
| | | | evaluation B (retention of strength) | 86 | 20 | 81 | 88 | 60 | 65 |
| | Izod impact strength, notched (kg · cm/cm) | | | 10.4 | 3.5 | 1.9 | 1.5 | 16.4 | 18.4 |
| | flexural modulus (kg/cm²) | | | 24000 | 26200 | 27600 | 28500 | 20100 | 17900 |
| | tensile strength (kg/cm²) | | | 541 | 582 | 610 | 620 | 532 | 482 |
| | tensile elongation (%) | | | 92 | 200< | 32 | 14 | 200< | 200< |
| | | | | Comp. Ex. 8 | Comp. Ex. 9 | Comp. Ex. 10 | Comp. Ex. 11 | Comp. Ex. 12 | |
| (A) | PBT (pts. wt.) | | | 90 | 85 | — | — | — | |
| | brominated copolyester (pts. wt.) | | | — | — | 100 | 85 | 90 | |
| (B) | acrylonitrile-styrene copolymer (pts. wt.) | | | — | — | — | 15 | — | |
| (C) | E/GMA-g-AN/S (pts. wt.) | | | — | — | — | — | 10 | |
| | E/GMA-g-MMA/BA (pts. wt.) | | | 10 | 15 | — | — | — | |
| Physical properties | flexing endurance | 23° C., 50% RH | evaluation A (observation with eyes) | 3.4 | 3.6 | 2.5 | 3.8 | 3.2 | |
| | | | evaluation B (retention of strength) | 61 | 67 | 24 | 78 | 59 | |
| | Izod impact strength, notched (kg · cm/cm) | | | 18.5 | 21.2 | 3.4 | 1.7 | 16.0 | |
| | flexural modulus (kg/cm²) | | | 19400 | 17500 | 26800 | 28000 | | |
| | tensile strength (kg/cm²) | | | 504 | 480 | 557 | 590 | 512 | |
| | tensile elongation (%) | | | 200< | 200< | 200< | 34 | 200< | |

TABLE 3

| | | | Ex. 11 | Ex. 12 | Ex. 13 | Ex. 14 | Comp. Ex. 13 |
|---|---|---|---|---|---|---|---|
| (A) | PBT (pts. wt.) | | 65 | 65 | 65 | 65 | 75 |
| (B) | polymethyl methacrylate (pts. wt.) | | 25 | 25 | 25 | — | 25 |
| | polystyrene (pts. wt.) | | — | — | — | 25 | — |
| (C) | E/GMA-g-AN/S (pts. wt.) | | 10 | — | — | 10 | — |
| | E/GMA-g-PS (pts. wt.) | | — | 10 | — | — | — |
| | E/GMA-g-PMMA (pts. wt.) | | — | — | 10 | — | — |
| Physical properties | flexing endurance 23° C., 50% RH | evaluation A (observation with eyes) | 4.6 | 4.5 | 4.5 | 4.6 | 4.1 |
| | | evaluation B (retention of strength) | 94 | 94 | 92 | 94 | 83 |
| | Izod impact strength, notched (kg · cm/cm) | | 8.9 | 8.7 | 9.2 | 9.0 | 1.8 |
| | flexural modulus (kg/cm²) | | 24800 | 24700 | 24900 | 24800 | 28400 |
| | tensile strength (kg/cm²) | | 568 | 571 | 566 | 574 | 615 |
| | tensile elongation (%) | | 60 | 63 | 57 | 62 | 16 |
| | | | Comp. Ex. 14 | Comp. Ex. 15 | Comp. Ex. 16 | Comp. Ex. 17 | |
| (A) | PBT (pts. wt.) | | 75 | 90 | 90 | 90 | |
| (B) | polymethyl methacrylate (pts. wt.) | | — | — | — | — | |
| | polystyrene (pts. wt.) | | 25 | — | — | — | |
| (C) | E/GMA-g-AN/S (pts. wt.) | | — | 10 | — | — | |
| | E/GMA-g-PS (pts. wt.) | | — | — | 10 | — | |
| | E/GMA-g-PMMA (pts. wt.) | | — | — | — | 10 | |
| Physical properties | flexing endurance 23° C., 50% RH | evaluation A (observation with eyes) | 4.0 | 3.3 | 3.2 | 3.2 | |
| | | evaluation B (retention of strength) | 84 | 60 | 56 | 57 | |
| | Izod impact strength, notched (kg · cm/cm) | | 1.6 | 16.4 | 16.2 | 16.0 | |
| | flexural modulus (kg/cm²) | | 28100 | 20100 | 19800 | 20200 | |
| | tensile strength (kg/cm²) | | 597 | 532 | 515 | 528 | |
| | tensile elongation | | 17 | 200< | 200< | 200< | |

TABLE 4

| | | Ex. 15 | Comp. Ex. 18 | Comp. Ex. 19 | Ex. 16 | Comp. Ex. 20 | Comp. Ex. 21 |
|---|---|---|---|---|---|---|---|
| (A) | PBT (pts. wt.) | 55 | 80 | 70 | — | — | — |
| | PET (pts. wt.) | — | — | — | 55 | 80 | 70 |
| (B) | acrylonitrile-styrene copolymer (pts. wt.) | 15 | — | — | 15 | — | — |
| (C) | E/GMA-g-AN/S (pts. wt.) | 10 | — | 10 | 10 | — | 10 |
| | glass fiber (pts. wt.) | 20 | 20 | 20 | 20 | 20 | 20 |

TABLE 4-continued

|  |  | Ex. 15 | Comp. Ex. 18 | Comp. Ex. 19 | Ex. 16 | Comp. Ex. 20 | Comp. Ex. 21 |
|---|---|---|---|---|---|---|---|
| Physical properties | flexing endurance (break angle) | 31~42 | 19~23 | 22~27 | 33~37 | 17~23 | 21~28 |
|  | Izod impact strength, notched (kg · cm/cm) | 14.2 | 6.5 | 20.5 | 12.4 | 4.8 | 18.8 |
|  | tensile strength (kg/cm$^2$) | 1081 | 1120 | 1010 | 1207 | 1250 | 1085 |
|  | tensile elongation (%) | 5.2 | 2.6 | 8.3 | 4.6 | 1.9 | 7.9 |
|  | thermal deformation temp. (°C.) | 209 | 209 | 206 | 220 | 220 | 217 |

We claim:

1. A thermoplastic polybutylene terephthalate resin composition comprising a blend of:
   (A) 100 parts by weight of a thermoplastic polybutylene terephthalate resin;
   (B) 3 to 80 parts by weight of a polymer selected from the group consisting of methylmethacrylate homopolymer, styrene homopolymer or a copolymer consisting of acrylonitrile and styrene; and
   (C) 1 to 50 parts by weight of an ethylene-glycidyl methacrylate copolymer.

2. A hinged molded article which consists essentially of a thermoplastic polybutylene terephthalate resin composition comprised of a blend of:
   (A) 100 parts by weight of a thermoplastic polybutylene terephthalate resin;
   (B) 3 to 80 parts by weight of a polymer selected from the group consisting of methylmethacrylate homopolymer, styrene homopolymer or a copolymer consisting of a acrylonitrile and styrene; and
   (C) 1 to 50 parts by weight of an ethylene-glycidyl methacrylate copolymer.

* * * * *

UNITED STATES PATENT AND TRADEMARK OFFICE
CERTIFICATE OF CORRECTION

PATENT NO. : 5,290,864
DATED : March 1, 1994
INVENTOR(S) : Mochizuki et al

It is certified that error appears in the above-indentified patent and that said Letters Patent is hereby corrected as shown below:

Column 1, line 13, delete "to a thermoplastic polyester";
　　　　　line 14, delete "resin composition";
　　　　　line 15, change "excellent exhibits" to --exhibits excellent--;
　　　　　line 22, delete "properties";
　　　　　line 34, delete "properties" and insert --property--;
　　　　　line 47, delete "obtained" and insert --obtain--;
　　　　　line 48, after "poor" delete "in";
　　　　　line 51, change "resins" to --resins'--;
　　　　　line 53, change "resin" to --resins'--;
　　　　　line 55, after "plications" insert --appreciably improved impact resistance is achieved--.

Column 2, line 1, change "resistant" to --resistance--;
　　　　　line 8, change "lower" to --lowering-- and change "resins" to --resin's--.

Column 7, line 31, change "convention" to --conventional--;
　　　　　line 36, after "by" delete "the".

Signed and Sealed this

Fifth Day of July, 1994

*Attest:*

BRUCE LEHMAN

*Attesting Officer*　　*Commissioner of Patents and Trademarks*